May 6, 1924.

R. BURNS

HAY HANDLING DEVICE

Filed Aug. 22, 1922

1,493,321

Inventor
Renua Burns
By Jerry A. Mathews,
Attorney

Patented May 6, 1924.

1,493,321

UNITED STATES PATENT OFFICE.

RENUA BURNS, OF GALLOWAY, OHIO.

HAY-HANDLING DEVICE.

Application filed August 22, 1922. Serial No. 583,567.

*To all whom it may concern:*

Be it known that RENUA BURNS, a citizen of the United States, residing at Galloway, in the county of Franklin and State of Ohio, has invented certain new and useful Improvements in Hay-Handling Devices, of which the following is a specification.

My invention relates to a conveying and swinging device, for handling hay or the like.

An important object of the invention is to provide a device of the above mentioned character, so constructed that the fork or harpoon may be swung to various positions, prior to dropping the hay upon the mow, thus dispensing with the necessity of shifting the hay by means of a fork, and which is also so constructed that the fork or harpoon is suspended at a suitable distance, whereby the hay will not drop too great a distance upon the mow, and thereby becoming unduly packed, so that it will be mowburned.

A further object of the invention is to provide a device of the above mentioned character, which is simple in construction, convenient in use, strong and durable.

Other objects and advantages of the invention will be apparent during the course of the following description.

Figure 1:
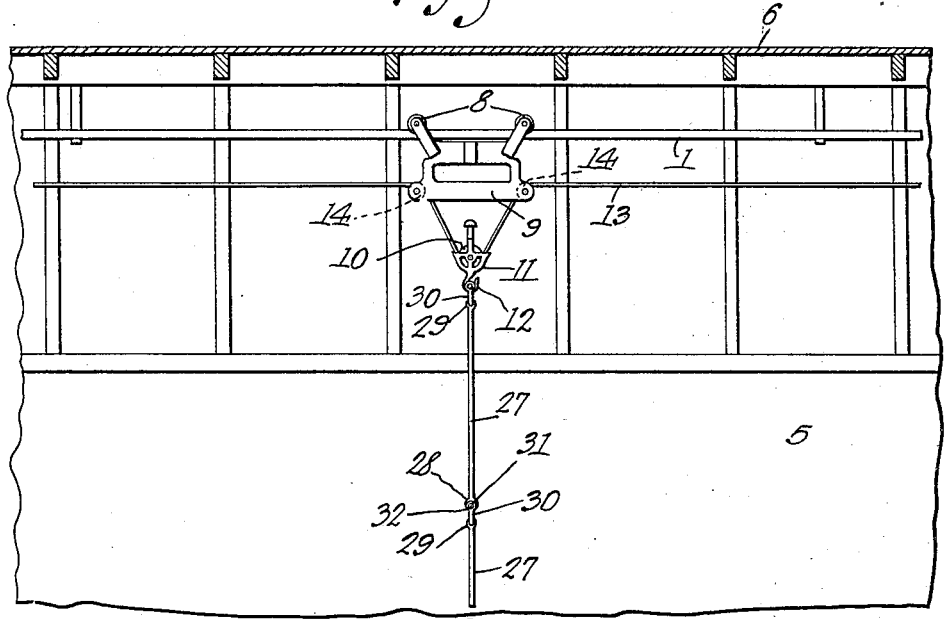
Figure 2:
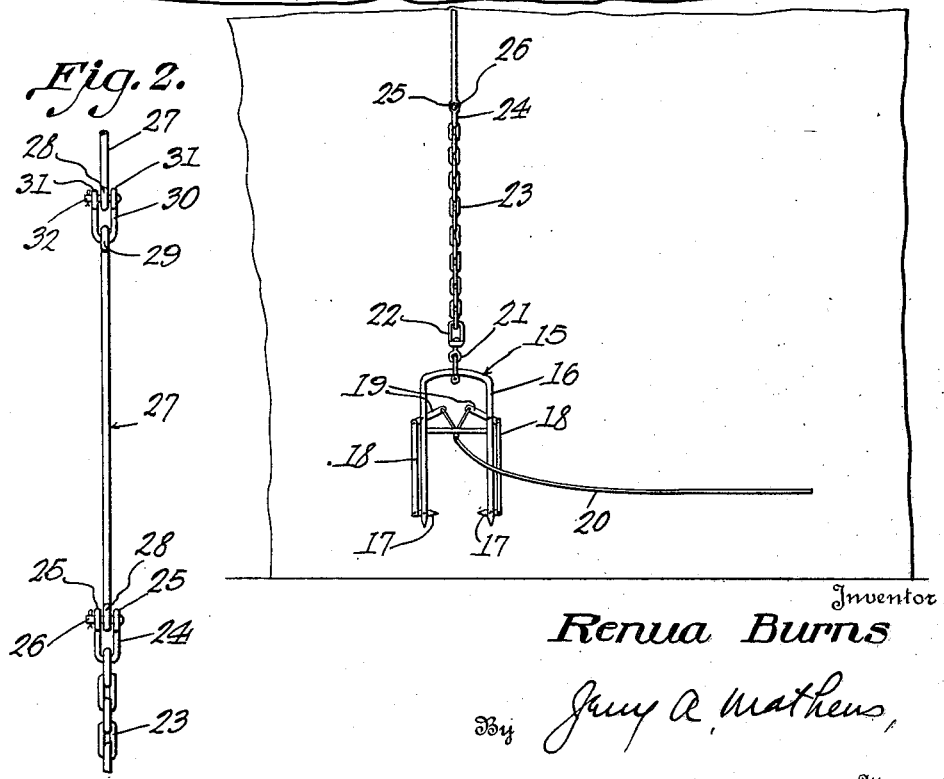

In the accompanying drawings forming a part of this specification and in which like numerals are employed to designate like parts throughout the same, Fig. 1 is a side elevation of a device embodying my invention, and, Fig. 2 is a side elevation of one of the rod-links.

In the drawings, wherein for the purpose of illustration is shown a preferred embodiment of my invention, the numeral 5 designates a shed or mow, having a suitable top 6.

Extending longitudinally within the upper portion of the mow is a suitably supported track 7 receiving wheels 8 of a carriage 9.

The numeral 10 designates a trip pulley, held in a frame 11, carrying a hook 12. This trip pulley may be connected with the carriage 9 by a cable 13, engaging pulleys 14 secured to the carriage 9. The cable 13 may be employed to shift the carriage 9 longitudinally upon its track and also to raise and lower the trip pulley 11.

The numeral 15 designates a hay hook or harpoon, as a whole, embodying a frame 16, upon which are pivoted tines 17, connected with links 18, operated by levers 19. The levers are swung upon their pivots by a cable 20 or the like. By pulling the levers 19 downwardly, the tines 17 are swung upon their pivots from the horizontal position, and the hay is released. If the hay is released at a point which is too great a distance from the mow, the hay will unduly pack, and there is a tendency for it to mowburn. For this reason, it is desired that the harpoon 15 be supported at a slight distance above the mow, so that this excessive packing, due to the falling of the hay for too great a distance, will be eliminated.

Connected with the top of the U-shaped frame 16 is an eye bolt 21, having a swiveled connection with a clevis 22, connected with a flexible chain 23. The chain 23 is provided at its upper end with a clevis 24, permanently secured thereto, this clevis having eyes 25, as shown. These eyes are adapted to receive a bolt or pin 26, detachably mounted therein.

The numeral 27 designates a plurality of rod-links, of suitable length, each of which is provided at its lower end with an eye 28. Each rod link is provided at its upper end with an eye 29, receiving and permanently holding a clevis 30, having eyes 31, detachably receiving bolts 32.

Any number of rod-links 27 may be employed. The bolt 26 is inserted in the eye 28 of the lowermost rod-link 27, while the bolt 32 carried by the clevis at the top of the lowermost rod-link is passed through the eye 28 of the next upper rod-link. The uppermost rod-link has its bolt 32 engaged within the hook 12.

It is thus seen that the rod-links are pivotally supported from the hook, so that the entire device may swing, while the chain 23 provides for local flexibility. As the hay is stacked in the mow, the lowermost rod-link may be removed, when the bolt 26 of the clevis 24 is passed through the eye at the lower end of the next upper rod-link. By this means the harpoon may be located only a slight distance above the mow, and hence the hay will not fall for too great a distance, when released.

It is to be understood that the form of the invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A conveying and swinging device for handling hay or the like, comprising an elevated track, a carriage to travel on the track, a trip pulley beneath the carriage, a line connecting the trip pulley and the carriage to raise and lower the pulley and to move the carriage longitudinally upon the track, a plurality of rods provided at their ends with eyes, U-shaped clevises pivotally mounted within the eyes at the upper ends of the rods and provided at their ends with eyes, bolts extending through the eyes of the clevises, the bolt in the upper clevis engaging with said carriage, and the bolt in the clevis which is secured to the upper end of the lower rod extending through the eye at the lower end of the upper rod, a U-shaped clevis provided at its ends with eyes, a bolt passing through the eyes of the last named clevis and through the eye at the lower end of the lower rod, a chain having its upper end permanently connected with the last named clevis, a releasable hay engaging harpoon, and a swiveled joint between the harpoon and the lower end of the chain.

In testimony whereof I affix my signature.

RENUA BURNS.